(12) United States Patent
Forck et al.

(10) Patent No.: US 8,005,045 B2
(45) Date of Patent: Aug. 23, 2011

(54) METHOD FOR OPERATING RADIO COMMUNICATION SYSTEM, INCLUDING SENDING STATION AND RECEIVING STATION THEREOF

(75) Inventors: Andreas Forck, Berlin (DE); Thomas Haustein, Potsdam (DE); Volker Jungnickel, Berlin (DE); Clemens von Helmolt, Berlin (DE); Wolfgang Zirwas, München (DE)

(73) Assignees: Nokia Siemens Networks GmbH & Co. KG, Munich (DE); Fraunhofer Gesellschaft zur Forderung Der Angewandten Forschung E.V., Munich (DE)

( * ) Notice: Subject to any disclaimer, the term of this patent is extended or adjusted under 35 U.S.C. 154(b) by 0 days.

(21) Appl. No.: 12/306,685

(22) PCT Filed: Jun. 25, 2007

(86) PCT No.: PCT/EP2007/056317
§ 371 (c)(1),
(2), (4) Date: Oct. 27, 2009

(87) PCT Pub. No.: WO2008/000717
PCT Pub. Date: Jan. 3, 2008

(65) Prior Publication Data
US 2010/0046402 A1    Feb. 25, 2010

(30) Foreign Application Priority Data
Jun. 26, 2006  (EP) .................................... 06013149

(51) Int. Cl.
*H04Q 7/00*    (2006.01)

(52) U.S. Cl. ........................................ 370/329; 370/280
(58) Field of Classification Search .................. 370/252, 370/277, 278, 280, 281, 328, 338, 329
See application file for complete search history.

(56) References Cited

U.S. PATENT DOCUMENTS

| | | | |
|---|---|---|---|
| 6,549,544 B1 * | 4/2003 | Kroeger et al. ............... | 370/482 |
| 7,180,963 B2 * | 2/2007 | Wang et al. ................... | 375/324 |
| 7,239,659 B2 * | 7/2007 | Thomas et al. ............... | 375/141 |

(Continued)

OTHER PUBLICATIONS

M. Sternad et al.; "Channel Estimation and Prediction for Adaptive FDM Downlinks OFDMA/TDMA Uplinks, based on Overlapping Pilots"; IEEE International Conference on Acoustics, Speech, and Signal Processing (ICASSP '05), Mar. 2005, pp. III-861 to III-864.

(Continued)

*Primary Examiner* — Ricky Ngo
*Assistant Examiner* — Christine Ng
(74) *Attorney, Agent, or Firm* — Staas & Halsey LLP

(57) ABSTRACT

In a radio communication system, at least a first frequency band is subdivided into C radio resource units which are allocable for radio transmissions between radio stations and terminals. Each radio resource unit has at least two adjacent subcarriers, for allocation of at least a first resource unit for a data transmission between a terminal and a radio station. The radio station receives from the terminal a first short training symbol which has spectrally the same bandwidth as the first frequency band and includes at least Q frequency carriers, where Q is greater or equal to C, but smaller than the total number of subcarriers. The radio station estimates the radio channel for at least the first radio resource unit using the first short training symbol, and an allocation of the first radio resource unit to the terminal is broadcasted by the radio station.

20 Claims, 8 Drawing Sheets

U.S. PATENT DOCUMENTS

| | | | | |
|---|---|---|---|---|
| 7,286,606 | B2* | 10/2007 | Maltsev et al. | 375/260 |
| 7,426,199 | B2* | 9/2008 | Sondur et al. | 370/332 |
| 7,818,013 | B2* | 10/2010 | Li et al. | 455/452.2 |
| 7,822,069 | B2* | 10/2010 | Medvedev et al. | 370/491 |

OTHER PUBLICATIONS

Sternad et al.; Channel Estimation and Prediction for Adaptive OFDM downlinks [vehicular applications]; IEEE 58th Vehicular Technology Conference, Oct. 2003, vol. 2.; pp. 1283-1287.

L. Huang et al.; "Channel Estimation Based on Delay-Subspace Filter for Uplink of CDM-OFDMA System"; IEEE International Symposium on Microwave, Antenna, Propagation and EMC Technologies for Wireless Communication, Aug. 2005; pp. 1415-1418.

L. Yue et al.; "An Improved Channel Estimation Scheme for OFDM Systems by Tracking the Subspace"; 14th IEEE Proceedings on Personal, Indoor and Mobile Radio Communication (PIMRC), Sep. 2003, vol. 2, pp. 1109-1113.

C. I. Yeh et al.; "An Efficient TDMA Based MAC Frame Structure in OFDM Systems"; 14th IEEE Proceedings on Personal, Indoor and Mobile Radio Communication (PIMRC), Sep. 2003, vol. 1, pp. 559-563.

International Search Report for Application No. PCT/EP2007/056317; mailed Aug. 2, 2007.

* cited by examiner

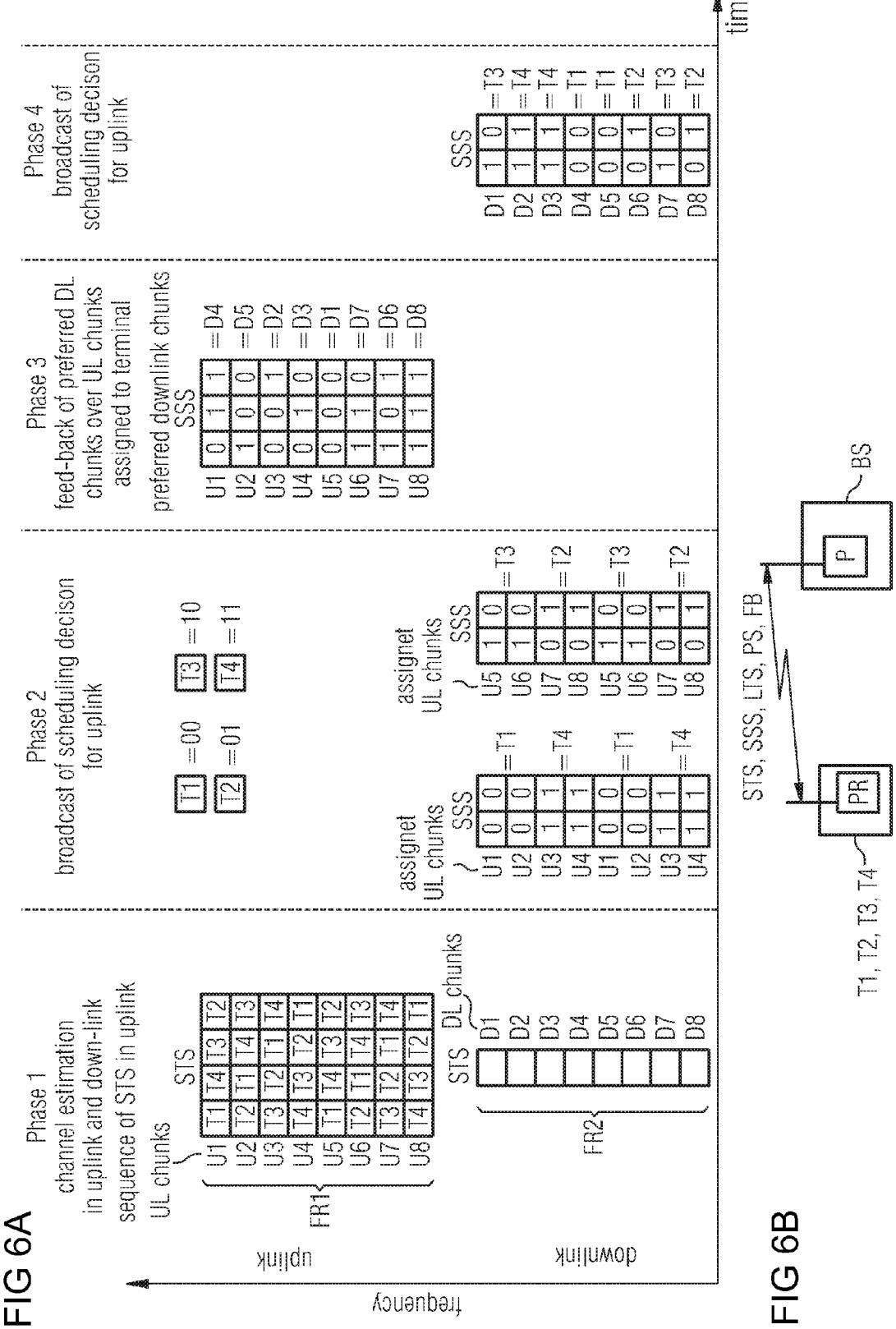

—◦— remaining taps after noise reduction
—— reconstructed from noisy pilot grid
----- original power-delay profile ● delay spread = 5 taps
○ delay spread = 10 taps

+ [2 6]   — 1/SNR   □ [1 4 8]   * [1 3 6 8]

METHOD FOR OPERATING RADIO COMMUNICATION SYSTEM, INCLUDING SENDING STATION AND RECEIVING STATION THEREOF

CROSS REFERENCE TO RELATED APPLICATIONS

This application is based on and hereby claims priority to European Patent Application No. 06013149 filed on Jun. 26, 2006, the contents of which are hereby incorporated by reference.

BACKGROUND

Described below is a method for operating a radio communication system as well as a respective sending station, a respective receiving station and respective software.

In future radio communication systems subcarriers of a frequency band used by a radio communication system will be assigned to a terminal for instance in form of radio resource units, so called chunks, whereas a radio resource unit includes at least two subsequent subcarriers.

For assignment of chunks with good transmission properties in uplink and chunks with good transmission properties in downlink, radio channels of subcarriers, i.e. channel coefficients (channel state information) of subcarriers, will have to be estimated for uplink and downlink transmissions. Further, channel state information (CSI) of the subcarriers of the assigned chunks, will have to be made available at a transmitting side (e.g. a radio station), to apply pre-coding techniques (e.g. dirty paper pre-coding) in order to use space-division multiplex (often called also joint transmission).

It is an open issue how to effectively identify chunks (i.e. fast and preferably the best chunks) to be assigned to a terminal and how channel state information of subcarriers of the assigned chunks can effectively (i.e. nearly instantaneously) be made available at a transmitting side, i.e. at the terminal for its uplink transmission and particularly at a radio station for its downlink transmission.

SUMMARY

An aspect is to provide an advantageous method for operating a radio communication system which enables chunk assignment and channel estimation of assigned chunks. It is a further aspect to provide a respective radio station and a respective terminal.

According to the method for operating a radio communication system which uses at least a first frequency band subdivided into C radio resource units which are allocable for radio transmissions between radio stations and terminals, whereas each radio resource unit includes at least two adjacent subcarriers, for allocation of at least a first resource unit for a data transmission between a terminal and a radio station, the radio station receives from the terminal a first short training symbol which has spectrally the same bandwidth as the first frequency band and includes at least Q frequency carriers whereas Q is greater or equal to C but smaller than the total number of subcarriers, the radio station estimates the radio channel for at least the first radio resource unit using the received first short training symbol, and an allocation of the first radio resource unit to the terminal is broadcasted by the radio station.

Using the first short training symbol the radio station is able to make a coarse estimation of radio channels of radio resource units and is therefore able to identify radio resource units which fulfil requirements to be allocated for further data transmission and/or data reception by the terminal. The coarse channel estimation gives information on transmission properties for all subcarriers of the first radio resource unit as a whole but no detailed information on single subcarriers of the first radio resource unit.

According to an advantageous embodiment the radio station receives the first short training symbol simultaneously from N terminals, whereas these N first short training symbols are transmitted by the terminals in an orthogonal way by focusing the respective transmission energy in different frequency carriers and whereas the terminals repeat the transmission of the first short training symbol J times, $J<=N$, while cyclically changing for each terminal the frequency carriers into which the energy is focused.

Radio resource units can be estimated simultaneously for a plurality of terminals and the transmission of first short training symbols can be stopped individually for each terminal after a predefined number of radio resource units with transmission properties, e.g. an estimated bit error rate, fulfilling a predefined threshold have been detected for the respective terminal.

Advantageously time division duplex (TDD) is used to separate transmissions to and from terminals and the first radio resource unit is allocated for transmissions to and from the terminal.

Using time division duplex at least two short signalling symbols are advantageously used for broadcasting the allocation of the first radio resource unit, whereas each short signalling symbol is transmitted using at least one subcarrier of the first radio resource unit and whereas bits received on the at least one subcarrier over the at least two short signalling symbols build a binary word identifying the terminal.

The radio station knows from uplink reception of the first short training symbol that the first radio resource unit has transmission properties fulfilling desired requirements in uplink. The first radio resource unit is used in downlink for signalling the allocation of the first radio resource unit to exploit the reciprocity of the radio channel in TDD. The radio station is therefore sure that the at least two short signalling symbols will be received and be decodable by the terminal.

Advantageously the first short training symbol is broadcasted by the radio station. The terminal can make a coarse estimation of radio channels of radio resource units using the first short training symbol. The channel estimation will be used to decode the at least two short signalling symbols.

In an alternative embodiment frequency division duplex (FDD) is used to separate transmissions to and from terminals and the first frequency band is used for transmissions from terminals to radio stations and at least a second frequency band is used for transmissions from radio stations to terminals, whereas the second frequency band is subdivided into K radio resource units which are allocable for radio transmissions and whereas each radio resource unit includes at least two adjacent subcarriers.

Advantageously, using frequency division duplex, at least two short signalling symbols are used for broadcasting the allocation of the first radio resource unit, whereas each short signalling symbol is transmitted using at least one subcarrier of at least one radio resource unit of the second frequency band, whereas the at least one radio resource unit is associated with the first radio resource unit at a terminal side, and whereas bits received on the at least one subcarrier of a single radio resource unit over the at least two short signalling symbols build a binary word identifying the terminal.

Advantageously a second short training symbol for estimation of radio channels of radio resource units of the second frequency band is broadcasted by the radio station. The second short training symbol has spectrally the same bandwidth as the second frequency band and includes at least Q' frequency carriers whereas Q' is greater or equal to K but smaller than the total number of subcarriers.

The second short training symbol enables the terminal to estimate radio channels of radio resource units of the second frequency band. The terminal can identify radio resource units with desired reception properties for signals received from the radio station.

Advantageously the radio station receives a resource information from the terminal on the first radio resource unit, whereas the resource information identifies at least a second radio resource unit of the second frequency band to be allocated by the radio station.

Using the resource information the terminal indicates radio resource units fulfilling desired reception properties and asks the radio station to allocate at least one of the indicated resource units. The radio station decides which and how many radio resource units are allocated.

The resource information can certainly also indicate an ordering of radio resource units in respect of reception properties, i.e. the radio station is able to identify which radio resource unit is best, second-best, third-best, and so on.

Advantageously the resource information includes at least two transmission symbols, e.g. short signalling symbols, received by the radio station on the first radio resource unit, and bits of the at least two transmission symbols build a binary word identifying the second radio resource unit.

Advantageously at least two short signalling symbols are used for broadcasting the allocation of the second radio resource unit, whereas each short signalling symbol is broadcasted using the second radio resource unit, and whereas bits of the at least two short signalling symbols build a binary word identifying the terminal.

The allocation of the second radio resource unit is signalled by transmitting the short signalling symbols on the radio resource unit to be allocated, i.e. the second radio resource unit. As the radio station knows from the resource information that the second radio resource unit shall be allocated and therefore has desired reception properties for the terminal, the radio station knows by using the second radio resource unit for signalling the resource allocation that the short signalling symbols will be received and be decodable by the terminal.

Advantageously Orthogonal Frequency Division Multiplex, OFDM, is used for radio transmissions.

Advantageously Orthogonal Frequency Division Multiple Access, OFDMA, is used for separation of different terminals.

According to an embodiment long training symbols are transmitted by the radio station and/or the terminal for estimation of radio channels of allocated radio resource units, whereas a long training symbol has spectrally the same bandwidth and structure as the first frequency band or the second frequency band and pilot signals are transmitted on at least two subcarriers in each allocated radio resource unit of the respective frequency band and whereas radio channels relating to subcarriers on which no pilot signals are transmitted are calculated by interpolation between received pilot signals in each case within an allocated radio resource unit.

The reception of long training symbols enables the terminal and/or the radio station to estimate and interpolate radio channels of all subcarriers of radio resource units allocated for data reception. This enables decoding of received data transmissions on all subcarriers of allocated radio resource units at the terminal and/or the radio station.

Advantageously feedback information relating to received pilot signals is transmitted from the terminal to the radio station and/or from the radio station to the terminal.

The received feedback information can be used to estimate and interpolate the radio channel at a transmitter side. Which enables the transmitter for example to pre-process (pre-code) transmitted signals, e.g. to reduce interference at the receiver.

Advantageously received pilot signals are projected onto the delay space and the feedback information contains only information relating to those projected pilot signals which have a power value greater than a threshold.

Reducing the feedback information to information relating to certain projected pilot signals reduces the signalling load on the air interface as well as the computational complexity of the radio channel estimation and interpolation.

Advantageously the threshold is dependent on a signal-to-noise ratio of the received pilot signals.

An method for operating a radio communication system which uses at least a first frequency band subdivided into C radio resource units which are allocable for radio transmissions between radio stations and terminals, whereas each radio resource unit includes at least two adjacent subcarriers, includes the following:

at least a first radio resource unit is allocated for transmissions from a radio station to a terminal and/or from the terminal to the radio station, a long training symbol for estimation of radio channels of the first radio resource unit is transmitted by the radio station and/or the terminal, whereas the long training symbol has spectrally the same bandwidth and structure as the first frequency band and pilot signals are transmitted on at least two subcarriers of the first radio resource unit, radio channels relating to subcarriers of the first radio resource unit on which no pilot signals are transmitted are calculated by interpolating between the at least two subcarriers, feedback information relating to received pilot signals is transmitted from the terminal to the radio station and/or from the radio station to the terminal, and received pilot signals are projected onto the delay space and the feedback information contains only information relating to those projected pilot signals which have a power value greater than a threshold.

Advantageously the threshold is dependent on a signal-to-noise ratio of the received pilot signals.

The radio station for a radio communication system, which uses at least a first frequency band subdivided into C radio resource units which are allocable for radio transmissions between radio stations and terminals, whereas each radio resource unit includes at least two adjacent subcarriers, allocates at least a first radio resource unit for a data transmission between a terminal and the radio station, receives from the terminal a first short training symbol which has spectrally the same bandwidth as the first frequency band and includes at least Q frequency carriers whereas Q is greater or equal to C but smaller than the total number of subcarriers, estimates the radio channel for at least the first radio resource unit using the received first short training symbol, and broadcasts an allocation of the first radio resource unit to the terminal.

The terminal for a radio communication system, which uses at least a first frequency band subdivided into C radio resource units which are allocable for radio transmissions between radio stations and terminals, whereas each radio resource unit includes at least two adjacent subcarriers, for getting allocated at least a first radio resource unit for a data transmission between the terminal and a radio station, the terminal transmits to the radio station a first short training symbol which has spectrally the same bandwidth as the first frequency band and includes at least Q frequency carriers whereas Q is greater or equal to C but smaller than the total number of subcarriers, whereas the radio station estimates the radio channel for at least the first radio resource unit using the received first short training symbol, and receives a broadcasted allocation of the first radio resource unit from the radio station.

The radio station and the terminal both show all features that are necessary for performing the method. Particularly the radio station and the terminal both can show respective means for performing the specific operations of the method or the specific method options.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 6A is a graph illustrating signalling of chunk allocation in FDD mode,

FIG. 6B is a block diagram of wireless transmission between terminals and a base station;

DETAILED DESCRIPTION OF THE EXEMPLARY EMBODIMENT

Figure 1:
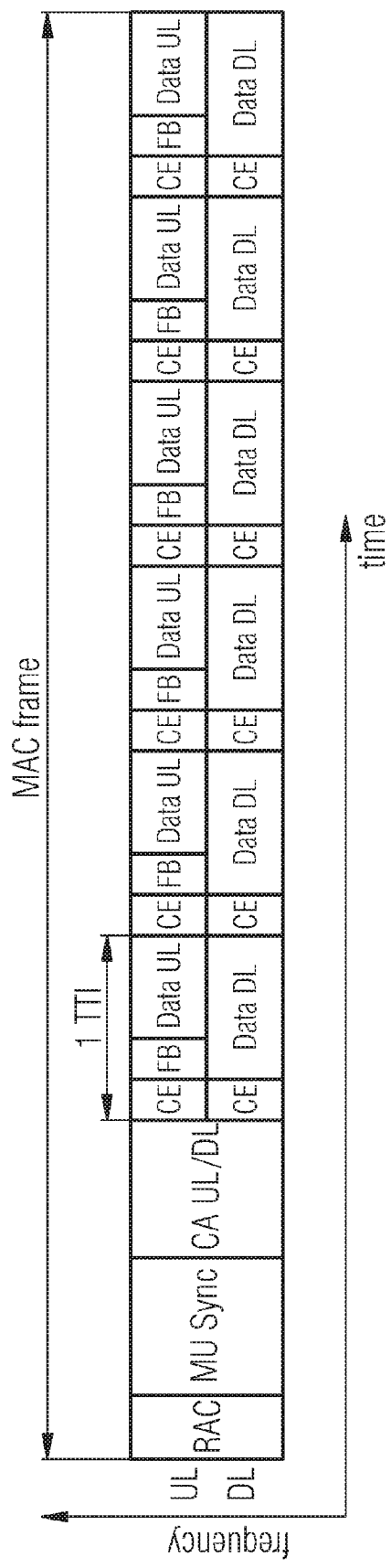
FIG. 1 is a data diagram of the structure of a MAC frame.

Reference will now be made in detail to the exemplary embodiments, examples of which are illustrated in the accompanying drawings, wherein like reference numerals refer to like elements throughout.

A radio station is for example a base station of a radio communications system.

A terminal is for instance a mobile radio terminal, particularly a mobile phone or a flexible fixed device, for transmission of picture data and/or sound data, for fax, short message service (SMS) messages and/or E-mail messages, and/or for internet access.

The method described herein can advantageously be used in any kind of radio communications system.

Radio communications systems are systems in which a data transmission between terminals is performed over an air interface. The data transmission can be both bidirectional and unidirectional. Radio communications systems are particularly cellular radio communication systems, e.g. using OFDMA. Also future mobile radio communications systems, e.g. according to the fourth generation, as well as ad-hoc-networks shall be understood as radio communication systems. Radio communication systems are also wireless local area networks (WLAN) according to standards from the Institute of Electrical and Electronics Engineers (IEEE) like 802.11a-i, HiperLAN1 and HiperLAN2 (High Performance Radio Local Area Network) as well as Bluetooth-Networks.

A chunk is a radio resource unit which includes at least two subsequent subcarriers of a frequency band which is used for radio transmissions in a radio communications system.

A four-step process is described below by which at the end precise instantaneous downlink channel state information becomes available at a base station of a radio communication system which uses at least a first frequency band subdivided into C radio resource units which are allocable for radio transmissions between base stations and terminals, whereas each radio resource unit includes at least two adjacent subcarriers.

The four steps are:
1. An efficient algorithm is proposed by which in uplink and downlink direction chunks are identified and assigned to terminals within which efficient and reliable communication between the base station and each terminal is possible (chunk assignment).
2. The uplink and downlink radio channels are estimated by the base station and the terminals, respectively, inside the assigned chunks using a sparse pilot grid.
3. Each terminal feeds back only the downlink channel coefficients estimated at subcarriers on which pilot signals have been received, or a uniform transformation of these signals. The channel coefficients may be quantized and transmitted simultaneously by all terminals to the base station in their assigned uplink chunks where safe communication can be guaranteed.
4. The base station reconstructs the channel state information (channel frequency response) in the downlink chunks assigned to each terminal using a so called chunk-wise interpolation. The reconstructed channel state information is for instance used at the base station for spatial precoding.

1. Chunk Assignment

Chunk assignment is basically a functionality of the multiple access control (MAC). In general, it is needed at a longer time scale than the frequent channel estimation at the physical layer (PHY). The chunk assignment is for instance repeated at a coarse time resolution, for instance once in a MAC frame covering multiple physical layer sub-frames (often called transmission time intervals, TTI).

The structure of a MAC frame is shown in principle in FIG. 1. Initially before or in parallel to the wideband link, there is an asynchronous narrow-band random access channel RAC where new terminals get connected and assigned a terminal index. Moreover, terminals may signal their uplink traffic demands to the base station over the RAC.

What follows is a multi-user synchronization procedure MU Sync in which admitted terminals are synchronized both in downlink and uplink. Then there is the chunk assignment procedure CA for uplink UL and downlink DL as described in detail below.

After chunks are assigned to terminals, signalling is further organized in sub-frames (TTIs). A frame starts by channel estimation CE in uplink UL and downlink DL. Afterwards, the estimated downlink parameters are individually fed back FB by each terminal via uplink chunks assigned to it. Note that parallel feedback transmission of multiple terminals is naturally enabled by the OFDMA chunk concept provided that the users are synchronized in the uplink. The base station is now well informed about the downlink channel and precoding can be realized to avoid interference among the terminals and to communicate with them using the same resources.

1.1. Identification of Useful Chunks in Downlink

Figure 2:
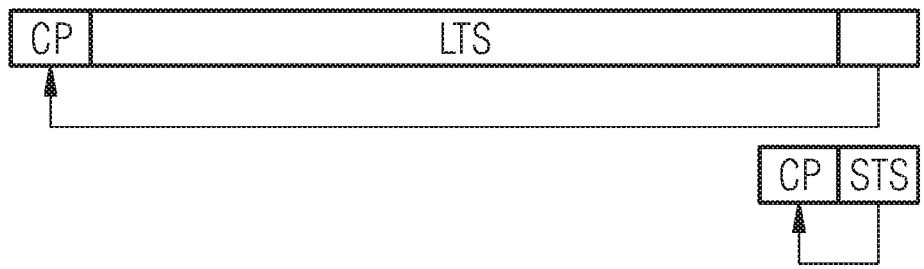
FIG. 2 is a data diagram illustrating a time structure of long training symbols and short training symbols.

For the chunk assignment, it is sufficient to have a coarse estimate of the frequency-selective structure of radio channels of subcarriers within chunks. For this reason it is proposed to use short training symbols STS and short signalling symbols SSS throughout the entire chunk assignment phase. For the uplink and downlink channel estimation in sub-frames (TTIs), long training symbols LTS are used which spectrally cover the frequency band, i.e. the subcarriers, used by the radio communication system. For the feedback of channel state information as well as for data transmission, long data symbols (LDS) are used. The temporal structure of short training symbols and long training symbols is schematically shown in FIG. 2 and the respective spectral structure is shown schematically shown in FIG. 3. By way of example a long training symbol LTS covers the frequency band of the radio communication system and has 4 chunks, each having 8 subsequent subcarriers whereas a short training symbol STS has 4 frequency carriers each covering the bandwidth of a chunk with no overlap with a different chunk. The length of the cyclic prefix CP must be the same for short training symbols STS and long training symbols LTS. Short training symbols should have at least as many frequency carriers as the frequency band is divided into chunks. Of course, due to the cyclic prefix CP insertion needed for OFDM, a short symbol must be at least twice as long as the cyclic prefix CP.

In the context of 3GPP LTE (3rd Generation Partnership Project Long Term Evolution) study item, one could divide the currently envisaged 2048 subcarriers using a chunk width of 16 subcarriers into 128 chunks out of which 75 are actually used giving a total number of 1200 sub-carriers used in roughly 18 MHz bandwidth. With a guard interval of 128 samples a short training symbol would have 128+128=256 samples, compared to a long training symbol having 2048+128=2176 samples. Each of the 75 subcarriers in a short training symbol corresponds to a whole chunk in a long training symbol.

Figure 3:
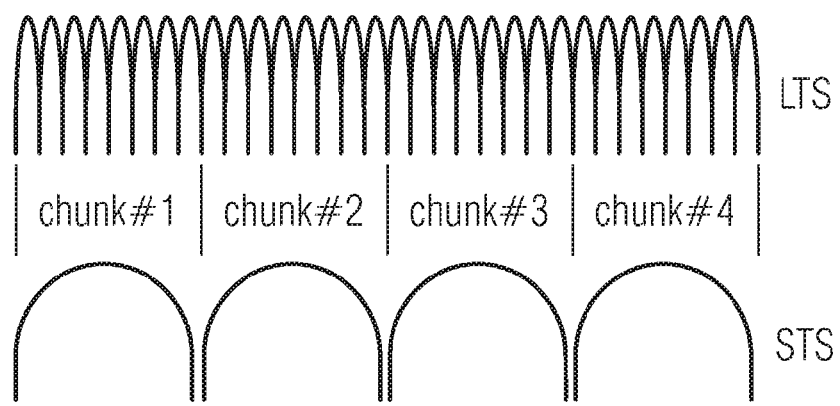
FIG. 3 is a graph illustrating a frequency structure of long training symbols and short training symbols.

In the example of FIG. 3 it can be observed that a single subcarrier in the short training symbol STS covers the same bandwidth as all subcarriers associated to a chunk in the long training symbol LTS. In this way, a coarse overview on the frequency response of the subcarriers of a chunk can be obtained already by transmitting a single short training symbol STS. With a single short training symbol STS transmitted in the downlink, each terminal can identify the chunks where channel quality is above a certain threshold. Now each terminal knows the coarse structure of its own downlink channel and selects a number of preferred chunks at which reliable communication would be possible. The principal method can be extended to the use of multiple transmit antennas by transmitting a sequence of short training sequences STS where each antenna is identified by a Hadamard sequence reused on all subcarriers and applying scrambling along the frequency axis as described in WO 2006008305 A1.

1.2. Identification of Useful Chunks in the Uplink

Also in the uplink, the best spectral regions (chunks) must be found for each terminal individually. In the uplink, the chunk concept has the great advantage that terminals can focus energy in a narrow spectral region. In this way, sufficient coverage can be achieved despite the power of terminals is limited and much smaller than that of a base station.

Figure 4:
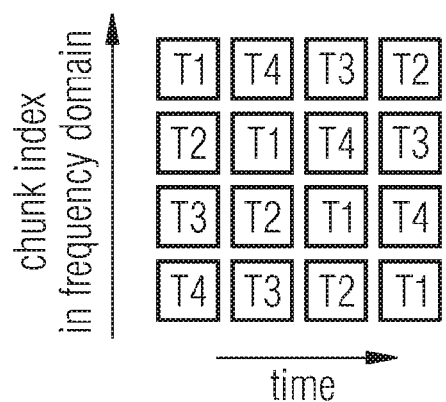
FIG. 4 is a graph illustrating a sequence of four short training sequences sent by four terminals.

For example via respective broadcast information from the base station, each terminal is well informed about the total number N of terminals admitted in the cell. It is proposed that each out of these N terminals transmits simultaneously a short training symbol STS, whereas these N short training symbols are designed in an orthogonal way as illustrated for N=4 in FIG. 4. At a certain instance in time each terminal T1, T2, T3, T4 transmits its short training symbol while focusing the energy in different chunks so that each terminal transmits pilot signals contained in its short training symbol only the respective chunks. The focusing of energy is exploited by applying a cyclic assignment of chunks—into which the respective energy is focused—from short training symbol STS to short training symbol STS. After a sequence of not more than N short training symbols STS, the radio channel of each terminal is completely sounded, i.e. the radio channel is known for the whole frequency band.

Note that the channel sounding of a particular terminal can be stopped if enough chunks are identified being good enough for reliable transmission. This is particularly likely in FDD (Frequency Division Duplex) mode, where a stop signal can be transmitted in the downlink simultaneous to the ongoing channel sounding in the uplink. In this way, the length of the short training symbol STS up-link sequence is minimized.

Now the base station has a good overview on the channel quality of each terminal and is enabled to schedule the chunks for the uplink in an optimal way.

As will be seen later in section 1.4, the coarse uplink estimation is the major driver for the required signalling resources. In particular, with the "scanning" scheme depicted in FIG. 4, the effort scales linearly with the number of terminals, which can be large in a cellular radio communication system. Hence it is better to evolve this scheme in some way.

Supposed the channel quality of good channels varies only slowly in time, terminals with continuous traffic (e.g. voice over IP, video), which have already been assigned to a certain chunk in previous super-frames, must not actually scan the entire spectrum for the next super-frame. Rather they could test the channel at the current and adjacent chunk indices only and stop their scanning for new chunks then.

In this way, only terminals with discontinuous traffic (best effort: email, internet) should actually search for chunks by scanning at the positions not already assigned in previous super-frames to terminals with continuous traffic. The demand for continuous transmission could be signalled e.g. at the end of the uplink signalling block (i.e. in phase 3 of FIG. 6).

1.3. Signalling of Chunk Assignment and Other Transmission Parameters

At first, we explain the simpler TDD (Time Division Duplex) approach before the procedure for FDD mode is described.

Figure 5A:
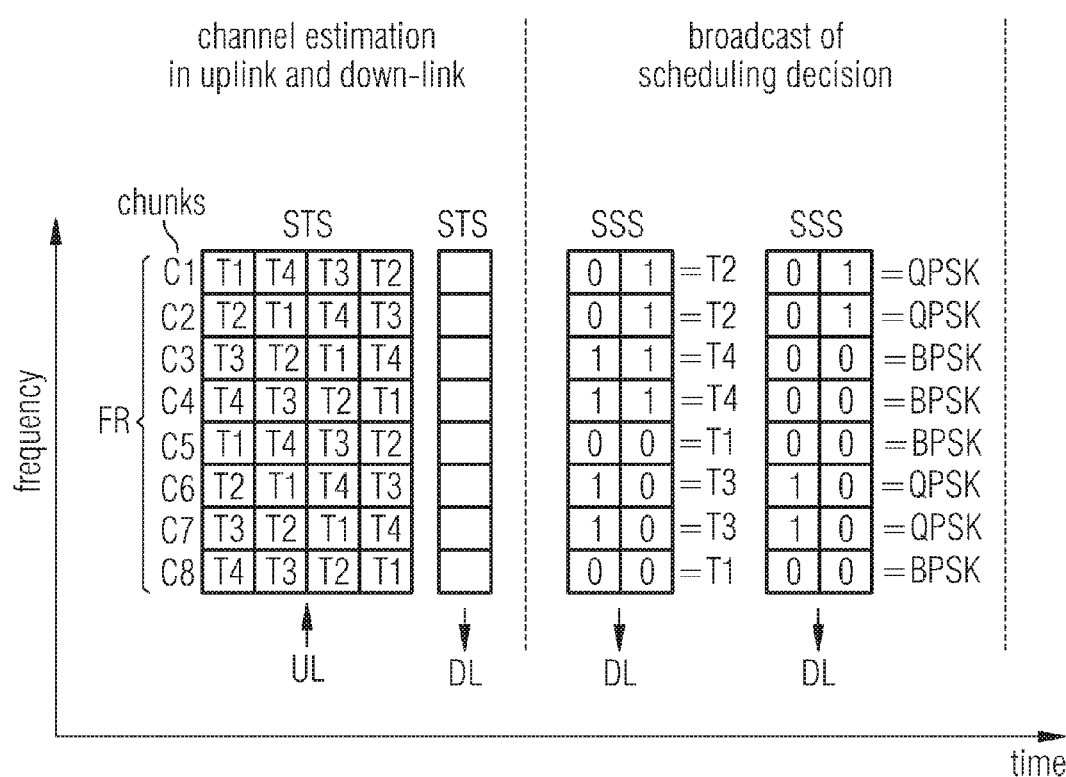
FIG. 5A is a graph illustrating signalling of chunk allocation in TDD mode.
Figure 5B:
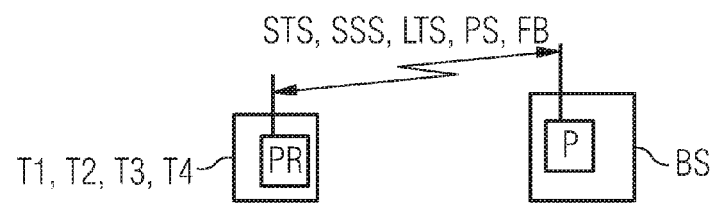
FIG. 5B is a block diagram of wireless transmission between terminals and a base station.

In TDD systems, the channel is the same in uplink and downlink and hence the scheduling decision for both transmission directions can be based on channel estimation in the uplink. This means that in TDD mode for the purpose of chunk assignment no prior channel sounding in the down-link is required. The procedure for chunk assignment is organized as follows:

In FIG. 5 a sequence of short training symbols STS is transmitted in the uplink by all terminals in a frequency band FR which is subdivided into eight chunks C1, C2, C3, C4, C5, C6, C6, C7, C8 each having for instance 16 subcarriers, which are not shown in the figure. Four terminals T1, T2, T3, T4 each transmit four times a short training symbol STS and each terminal focuses its energy into two chunks for each short training symbol STS. A base station BS uses the received short training symbols STS to estimate uplink channel state information for each chunk C1, C2, C3, C4, C5, C6, C6, C7, C8 for each terminal T1, T2, T3, T4 to make a decision about the chunk assignment. Next, a short training symbol STS is transmitted in the downlink to estimate the downlink channel at each terminal. Finally a terminal index and the feasible modulation index are broadcasted in each chunk.

A sequence of short signalling symbols SSS which is used for this purpose is constructed so that the data transmitted at a single subcarrier over multiple short signalling symbols SSS can be regarded as a binary word identifying the index of the terminal to which the corresponding chunk is assigned. Chunks 1 and 2 are assigned to terminal T2, identified by the word "0 1", chunks 3 and 4 are assigned to terminal T4, identified by the word "1 1", chunks 5 and 8 are assigned to terminal T1, identified by the word "0 0" and chunks 6 and 7 are assigned to terminal T3, identified by the word "1 0". Since the base station already knows from the estimation of the uplink chunks that the chunks addressed for a terminal in this way will have sufficient quality, the signalling information can be safely transmitted and encoded with little or no redundancy. Afterwards, the index of the modulation format used can be encoded and broadcasted in the same way. In FIG. 5 the transmission of two short signalling sequences gives a binary word for each chunk. The word "0 1" indicates for instance usage of QPSK (Quadrature Phase Shift Keying) for chunks 1, 2, 6 and 7 and the word "0 0" indicates for instance BPSK (Binary Phase Shift Keying" for chunks 3, 4, 5 and 8.

A single box simultaneously representing all four terminals T1, T2, T3, T4 is schematically shown in FIG. 5. Each terminal T1, T2, T3, T4 has a processor PR to control all functions necessary to perform the method. The base station BS is also only shown schematically. The base station has a processor P to control all functions necessary to perform the method.

In the FDD mode, the channel frequency responses are different for uplink and down-link and a little more complex scheme is required. The downlink channel can be estimated at the terminals using a short training symbol STS. Downlink scheduling must be done at the base station, however. Hence, a large number of terminals need to transmit the information about their preferred downlink chunks simultaneously to the base station in a safe way before the base station can make a scheduling decision and terminals can be informed about that decision. The process required can be divided into four phases shown in principle in FIG. 6.

A single box, simultaneously representing four terminals T1, T2, T3, T4, is schematically shown in FIG. 6. Each terminal T1, T2, T3, T4 has a processor PR to control all functions necessary to perform the method. A base station BS is also only shown schematically. The base station has a processor P to control all functions necessary to perform the method.

In the first phase, the base station BS estimates the channel of each terminal T1, T2, T3, T4 in the uplink using a sequence of N=4 short training symbols STS as described in connection with FIG. 5. In contrast to FIG. 5, a first frequency band FR1 is used for the uplink. The first frequency band FR1 is subdivided into eight uplink chunks U!, U2, U3, U4, U5, U6, U7, U8 each having for instance 16 subcarriers, which are not shown in the figure. The base station BS makes a scheduling decision which terminal uses which uplink chunk for reliable uplink transmission. To prepare the broadcasting of this scheduling decision, one short training sequence STS is broadcasted in downlink for the purpose of coarse channel estimation at the terminals. In downlink a second frequency band FR2 is used, which is subdivided in eight downlink chunks D1, D2, D3, D4, D5, D6, D7, D8 each having for instance 16 subcarriers, which are not shown in the figure. In full duplex FDD mode, the sequence of short training symbols STS in the uplink can be transmitted simultaneously with the short training symbol STS in the downlink.

In the second phase, the scheduling decision is now broadcasted to the terminals using short signalling symbols SSS with terminal T1 being identified by "0 0", terminal T2 by "0 1", terminal T3 by "1 0" and terminal T4 by "1". Downlink chunks D1 and D5 are assigned to uplink chunk U1 for the first two short signalling symbols and indicate that uplink chunk U1 has been allocated to the terminal T1 as well as uplink chunk U2 which is assigned to downlink chunks D2 and D6. Downlink chunks D3 and D7 are assigned to uplink chunk U3 for the first two short signalling symbols and indicate that uplink chunk U3 has been allocated to terminal T4 as well as uplink chunk U4 which is assigned to downlink chunks D4 and D8. During the second two short signalling symbols downlink chunks D1 and D5 are assigned to uplink chunk U5 and indicate that uplink chunk U5 has been allocated to terminal T3 as well as uplink chunk U6 which is assigned to downlink chunks D2 and D6. During the second two short signalling symbols downlink chunks D3 and D7 are assigned to uplink chunk U7 and indicate that uplink chunk U7 has been allocated to terminal T2 as well as uplink chunk U8 which is assigned to downlink chunks D4 and D8.

Generally the scheduling decision results in an ordered list containing the mapping between uplink chunk index and assigned terminal index. The principal ordering in that list (assignment of uplink chunks to downlink chunks) is known to all terminals so that the chunk index must not be broadcasted. Only the index of the terminal to which the chunk is assigned is broadcasted to the terminals in the downlink.

Since the downlink channel quality is not yet known to the base station, the link must be protected against fading. This can be realized in various well-known ways. In the example shown in FIG. 6, a "distributed" feed-forward concept is used by assigning an uplink chunk to two downlink chunks therefore enabling maximum ratio combining of the signals received on two downlink chunks. In order to exploit frequency diversity, this allocation of uplink chunks is repeated, i.e. the information is distributed in the frequency domain. Because of the redundancy the second sequence of two short signalling sequences SSS is needed in order to broadcast all scheduling information safely.

In the third phase, the preferred downlink chunks are now fed back to the base station BS by each terminal. Since at this moment the terminals know their assigned uplink chunks and the base station knows them as well, a safe data transmission is possible with minimal FEC overhead. In the example, the minimum channel information required for chunk assignment is signalled safely over the uplink. Each terminal sends a resource information about the preferred downlink chunks exclusively over uplink chunks assigned to it in phase 2. In the example in FIG. 6, a suitable number of preferred downlink chunks are signalled by each terminal to the base station using for instance short signalling symbols. Terminal T1 uses uplink chunks U1 and U2 to signal the resource information "0 1 1" indicating downlink chunk D4 and to signal the resource information "1 0 0" indicating downlink chunk D5. Terminal T4 uses uplink chunks U3 and U4, to signal the resource information "0 0 1" indicating downlink chunk D2 and to signal the resource information "0 1 0" indicating downlink chunk D3. Terminal T3 uses uplink chunks U5 and U6 to signal the resource information "0 0 0" indicating downlink chunk D1 and to signal the resource information "1 1 0" indicating downlink chunk D7. Terminal T2 uses uplink chunks U7 and U8 to signal the resource information "1 0 1" indicating downlink chunk D6 and to signal the resource information "1 1 1" indicating downlink chunk D8.

After phase 3, the basic information indicating the preferable chunks for each terminal is available at the base station where it is needed for the downlink chunk assignment. In the example in FIG. 6, it is assumed for simplicity that the base station directly follows the chunk assignments suggested by the terminals. This must not necessarily be the case since there could be contentions regarding some chunk indices which need to be resolved by the base station in the down-link chunk assignment algorithm. For the resolution of possible contention, fallback-solution chunks (i.e. second- and third-best) should be signalled to the base station from each terminal.

In phase 4, the downlink scheduling decision is broadcasted to all terminals similar as explained for the TDD mode (FIG. 5). Note again that the base station knows now in which downlink chunks the reception of each terminal has sufficient quality. Hence the downlink chunk assignment is now broadcasted safely to the terminals using a sequence of e.g. two short signalling symbols SSS.

When communication uses chunk-wise adaptive modulation, both phases 3 and 4 can be extended by transmitting the desired and assigned modulation format index, respectively, for the each chunk index.

Moreover, when the MAC frame is shared not only in frequency but also in time domain, the final broadcasting of chunk assignment phase can be extended to multiple sequences of short signalling symbols which reassign the chunks in each time slot. Note that the additional signalling overhead for time-frequency scheduling is restricted to this phase.

1.4. Resources Required for the Proposed Chunk Assignment Scheme

The required number of short training symbols and short signalling symbols can be evaluated as follows.

TDD Mode:

The effort depends on the number of terminals N, the total number of chunks C and the largest modulation index M.

At first, channel estimation is needed. It needs not more than N short training symbols STS in uplink and at least 1 in downlink (less than N for continuous allocation of resources, e.g. for voice-over-internet-protocol VoIP traffic). Broadcasting of chunk assignment needs $\log_2 N + \log_2 M$ short signalling symbols SSS in downlink.

Total:
Uplink: N
Downlink: $1 + \log_2 N + \log_2 M$

FDD Mode:

Here we distinguish between the phases. In phase 1 channel estimation needs again not more than N short training symbols STS in uplink and 1 in downlink. Phase 2 (broadcast of scheduling decision for uplink) needs $R \cdot \log_2 N$ short signalling symbols SSS in downlink where R is the redundancy factor needed to protect the broadcast against the fading (R=2 in the example in FIG. 6). Phase 3 (feedback of good downlink chunk indices) needs $S \cdot \log_2 C$ ($+\log_2 M$ if a modulation index M is suggested by the terminals) short signalling symbols SSS in uplink where C is the total number of chunks in frequency domain. It is also assumed that each terminal suggests S times the number of chunks that should be assigned to it which is helpful to resolve potential contention at the base station. Phase 4 needs $\log_2 N + \log_2 M$ short signalling symbols SSS in downlink.

Total
Uplink: $N + S \cdot \log_2 C$ ($+\log_2 M$)
Downlink: $1 + (R+1) \cdot \log_2 N + \log_2 M$ In general, the overhead scales linearly with the number of terminals (basically due to the required channel sounding in uplink) and logarithmically with the total number of chunks.

For a cellular application scenario (N=16, C=64, R=2, S=2, M=4) and TDD, per MAC frame we need N=16 short training symbols in uplink plus 7 short signalling symbols in downlink, in total these are 23 short symbols.

For a cellular application scenario (N=16, C=32, R=2, S=2, M=4) and FDD, we need to divide C by 2 compared to TDD when we assume that the bandwidth is shared between up- and downlink. So we need 16+2·5=26 short symbols in uplink and 1+(2+1)·4+2=15 short symbols in downlink.

The length of a short training symbol or a short signalling symbol must be at least twice as large as the cyclic prefix CP which gives 9.4 µs using current 3GPP LTE parameters. In the TDD mode, the two numbers for uplink and downlink add in time, hence the signalling for chunk assignment costs 23·9.4 µs=216 µs per MAC frame. In FDD mode, the larger number of short symbols needed in uplink is dominant while the downlink signalling can happen simultaneously. Hence, in FDD we need 26·9.4 µs=244 µs per MAC frame. Hence we need only 13% more time for chunk assignment than in TDD mode for the parameters in the example. Note that a typical MAC frame is 10 ms, so the total overhead for chunk assignment is only 2.4%.

The return on this investment is huge: Now the terminals need to feed back their channel state information only within the uplink chunks actually assigned. If N terminals are active in the system with 1/N of the bandwidth, the feed-back overhead for transmitting the channel state information is reduced by factor N, compared to transmitting the full-spectrum CQI for each terminal as in WiMax.

2. Channel Estimation Within TTIs
2.1. Downlink

Once the chunk assignment is finished, communication is organized in sub-frames (TTIs, see FIG. 1). At the beginning of each TTI, the channel is estimated both in downlink and uplink.

For downlink channel estimation, a long training symbol LTS is transmitted by the base station. Since the OFDM channel on adjacent subcarriers is correlated when using a long training symbol LTS, transmission of pilot signals PS may be limited to selected subcarriers on a pre-defined grid. Multiple base station antennas may be identified either by using a disjoint pilot grid or by transmitting pilots on the same subcarriers for all antennas. Another Hadamard sequence might be used as in the pilot design described in WO 2006008305 A1 or in V. Jungnickel et al., "1 Gbit/s MIMO-OFDM transmission experiments," IEEE VTC Fall 2005, Dallas, Tex.

At the terminal, the channel is interpolated between pilot subcarriers. The simplest scheme is linear interpolation, but it has reduced performance in fading channels particularly close to a fading hole. A better but still linear-algebraic scheme is described in V. Jungnickel et al. and reproduced in Appendix A.

Figure 7:
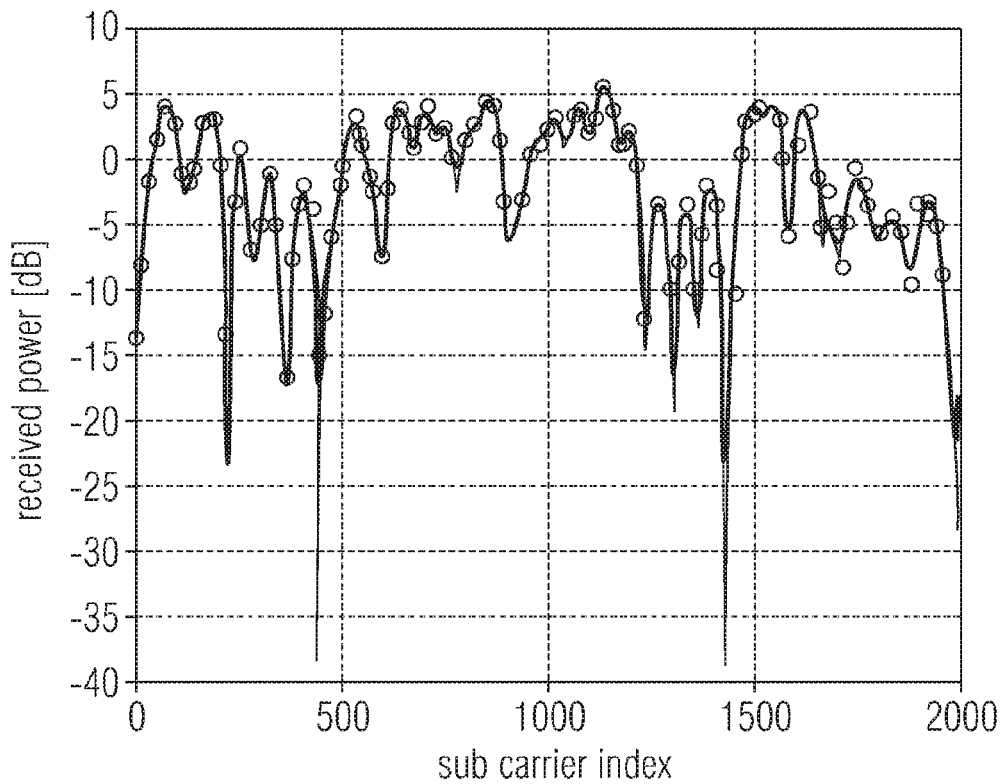
FIG. 7 is a graph illustrating interpolation of channel state information for downlink using a sparse pilot grid.
Figure 8A:
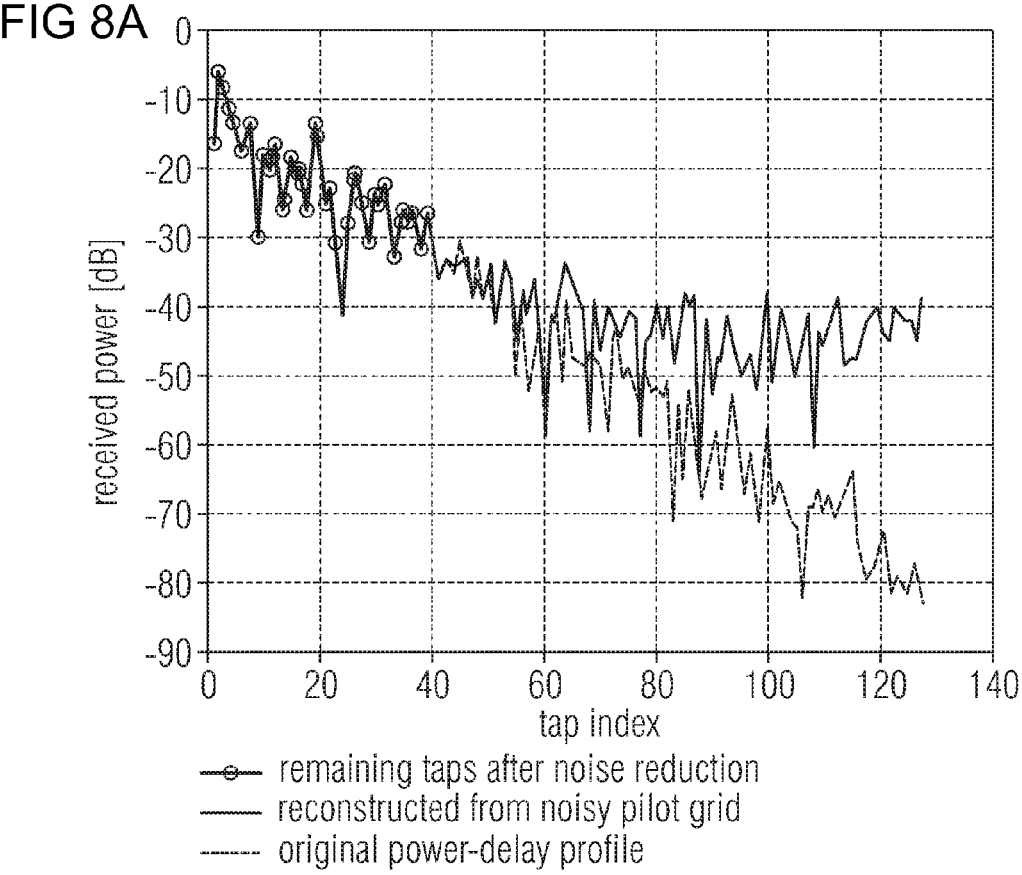
FIG. 8A is a graph of reconstructed channel impulse response.
Figure 8B:
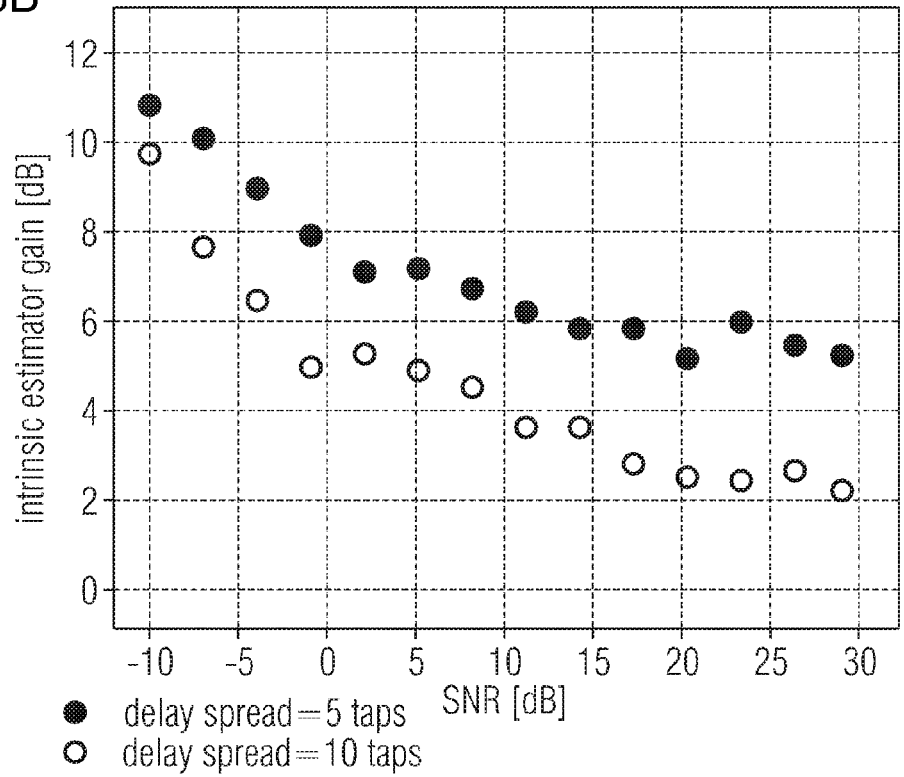
FIG. 8B is a graph of estimator gain versus SNR for different delay spreads.

The practical experiences with this algorithm show that
  it works on a sparse pilot grid when applied to a full-spectrum long training symbol LTS down to the maximal grid spacing as shown in FIG. 7 ($N_c$=2048 subcarriers and pilot signals sent on $N_{grid}$=128 subcarriers) in the full-spectrum configuration, one may achieve further gains when a noise reduction algorithm is used (see FIG. 8). Gains depend on the number of taps L, which can be seen from the algorithm described in Appendix A. Since less than L taps are resolved at low SNR further gain can be achieved.
  the meaning of the "time-domain channel coefficients" gets already lost if the system bandwidth is slightly reduced due to guard bands. The matrix $W_{red}$ becomes then singular (see Appendix B). But when the complete algorithm is used (apply $W \cdot W^+_{red}$ at once as a filter), the algorithm still works (has been tested for WLAN 802.11a OFDM parameters).
  already for small numbers of subcarriers, the computational complexity is significant However, when the original algorithm is applied to a narrow-band spectrum as in a chunk, results are good only for channels with a very short impulse responses and the algorithm needs to be revised.

2.2. Uplink

Since a sparse grid of pilots will be used for both uplink and downlink to enhance spectrum efficiency, a chunk-wise interpolation technique is needed which enables noise-limited interpolation of the channel between the samples in the pilot grid without prior information about the channel. It is an extension of the full-spectrum case mentioned in 2.1 and it is described in Appendix B. In principle, a singular value decomposition (SVD) based regularization technique is used to solve the singularity problem of the original algorithm.

Schematically the transmission of subcarriers with pilot signals PS from the radio station BS to the terminals T1, T2, T3, T4 and vice versa is shown in FIGS. 5 and 6.

Figure 13:
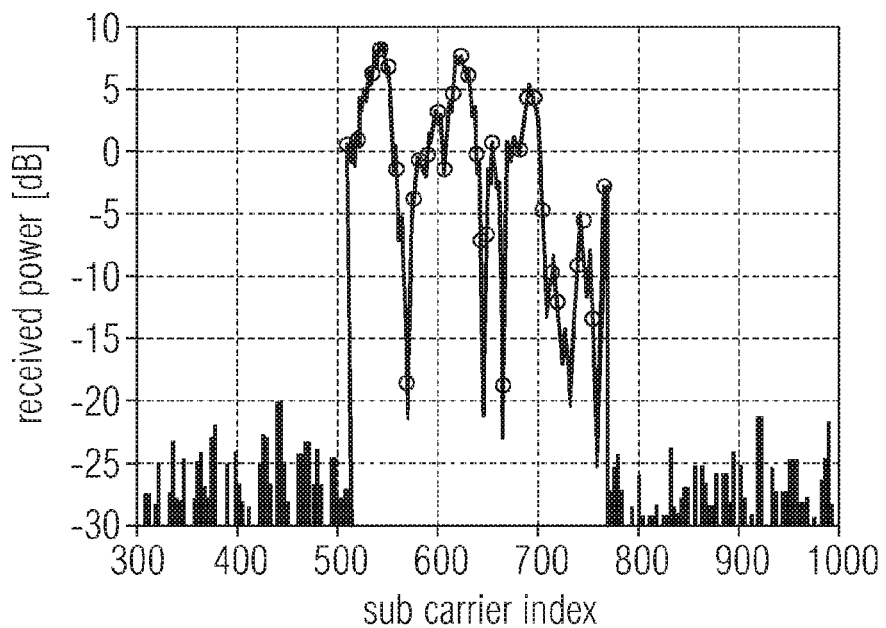
FIG. 13 is a graph of results of chunk-wise interpolation.
Figure 9A:
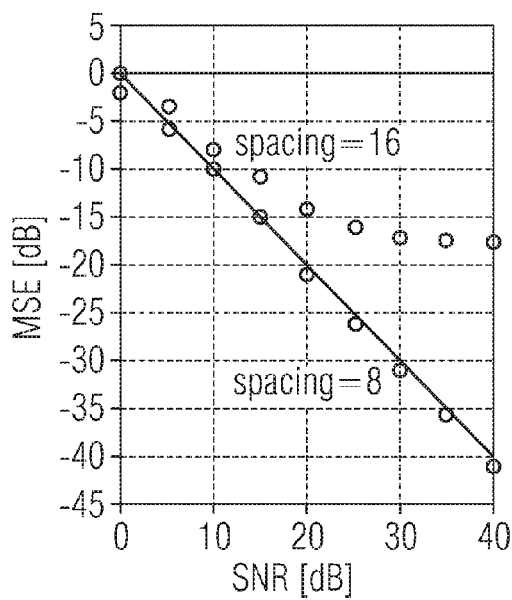
FIG. 9A is a graph of estimator gain G=MSE*SNR versus SNR.
Figure 9B:
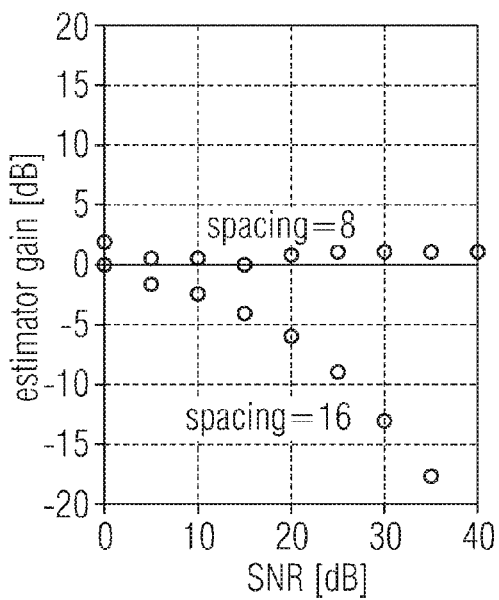
FIG. 9B is a graph of mean square error (MSE) versus SNR.

In FIG. 9 the mean square error (MSE) and the estimator gain obtained with this chunk-wise interpolation are shown for the same scenario as used in FIG. 13 (chunk width=256 subcarriers). With the theoretically maximal pilot spacing of 16 subcarriers between subcarriers with pilot signals PS, an error floor occurs while the MSE is noise-limited (i.e. proportional to 1/SNR) with a pilot spacing of 8 sub-carriers. The pilot spacing must be reduced when chunk-wise interpolation is used.

Figure 10A:
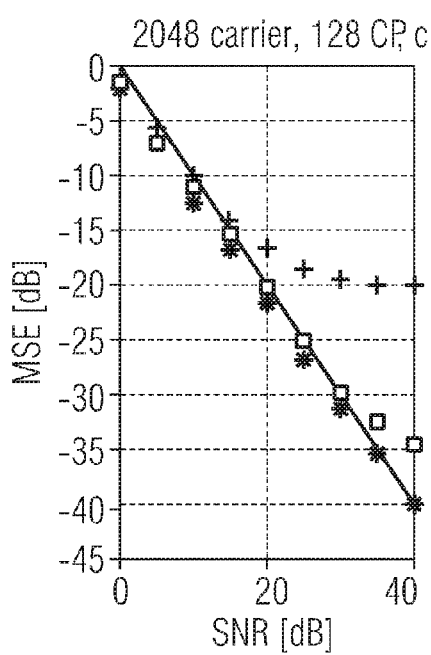
FIG. 10A is a graph of estimator gain for various pilot grids in a chunk.
Figure 10B:
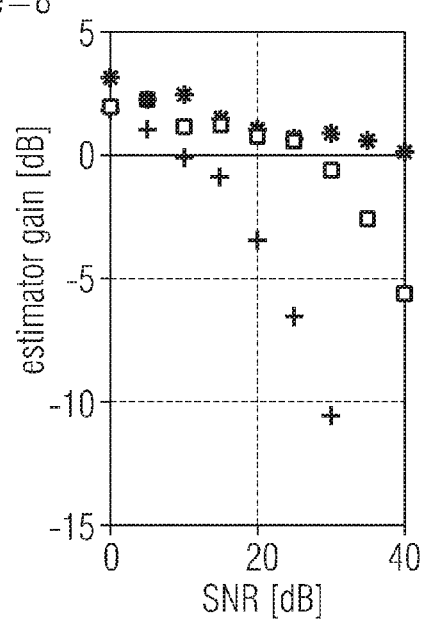
FIG. 10B is a graph of mean square error (MSE) versus SNR.

In FIG. 10 it is shown that the choice of the pilot grid has a big impact on performance. A much smaller chunk width of 16 is used. The numbers in brackets give the position of pilots in the chunk. Firstly, choosing very small chunks implies that pilot spacing must be further reduced. The use of two subcarriers with pilot signals PS per chunks at subcarrier positions [4 12] is insufficient, and one observes an error floor. It is important to include in the grid the subcarriers at the chunk edge. With three pilot signals PS at positions [1 8 16], typical MSE specifications (MSE~1/SNR, MSE<-30 dB for SNR>30 dB) can be met. But interpolation is not yet noise limited which is especially obvious from the plot of the estimator gain at SNR>20 dB. Noise-limited performance is achieved with 4 subcarriers with pilot signals PS at positions [1 6 11 16].

Note that the interpolation can be further improved using the standard Wiener filter approach if the signal-to-noise ratio SNR and the power-delay-profile are known.

2.2.1. Reduced Computational Complexity

We like to point out that significant savings in computational complexity are possible using chunk-wise interpolation.

For the full-spectrum approach, two matrix-vector multiplications must be realized consecutively. The matrix W has dimension $N_c \times L$, with $N_c$ the total number of subcarriers and L the number of taps (i.e. resolved multi-paths), and the matrix $W_{red}$ the dimension $N_{grid} \times L$ where $N_{grid}$ is the number of pilots in the grid. Here we count only the number of complex-valued multiplications. A similar number of additions must be performed which are typically pipelined with the multiplication in a DSP and cost no additional clock cycles.

The required number of multiplications required for full-spectrum interpolation is consequently $$\text{Mult}_{full\text{-}spectrum} = N_c \cdot L \cdot (1 + \rho_{grid}). \quad (1)$$

With $\rho_{grid} = N_{grid}/N_c$ is the density of the pilot grid. The two contributions come from the two matrix-vector multiplications separated by the vertical bar in (A.7). Complexity becomes significant when the numbers of subcarriers are large and longer guard intervals are used, as outdoors.

In the case of chunk-wise interpolation, of course, the singular value decomposition of the matrix $W_{red}$ needs to be calculated. But once the cut-off index $L_{eff}$ (see Appendix B) is fixed, it is sufficient to use a shortened projection (A.8) with a reduced matrix $U^H$ being of size $L_{eff} \times N_{grid}$ and a shortened multiplication with the predefined matrix $W \cdot V_{red} \cdot D_{red}^+$ which is of size $CW \times L_{eff}$ where CW is the chunk width. Then $$\text{Mult}_{chunk\text{-}wise} = CW \cdot L_{eff} \cdot (1 + \rho_{grid}) \quad (2)$$

multiplications are needed for interpolation within a single chunk. In (A.7) the cut-off index $L_{eff}$ is not yet known. For the OFDM parameters of 3GPP LTE $N_c$=2048, L=128), the MSE has been optimized for various chunk sizes and results are reproduced in the following table.

TABLE 1

Cut-off indices for various chunk sizes optimized by simulation

| | CW | | | | | | |
|---|---|---|---|---|---|---|---|
| | 8 | 16 | 32 | 64 | 128 | 256 | 512 | 1024 |
| $L_{eff}$ | 4 | 5 | 6 | 8 | 13 | 22 | 38 | 72 |

To make a fair comparison, a piecewise interpolation is assumed for the downlink as well, where the same technique as for chunk-wise interpolation is applied but on fractions of the downlink sparse pilot grid so that the piece-wisely interpolated frequency responses are finally combined. Then we need to repeat chunk-wise interpolation for $N_{chunk}$ pieces of the spectrum, but since $N_c = CW^* N_{chunk}$ we observe that the effort for piece-wise interpolation scales as $$\text{Mult}_{piece\text{-}wise} = N_c \cdot L_{eff} \cdot (1 + \rho_{grid}). \quad (3)$$

Compared to (1), the computational complexity is reduced by the factor $L_{eff}/L$ which can be significant. For example, with the numbers given in Table 1 we always have L=128 but $L_{eff}$ can be as small as 5 for a chunk width of 16 subcarriers. The computational complexity is then reduced by a factor of 128/5 ≈25, which makes the chunk-wise interpolation very attractive for real-time implementation.

2.2.2. SNR Estimation and Use of the Projection (A.8) for Feedback Compression The projection (A.8) basically projects the vector of raw estimates on the pilot grid onto a certain eigenspace, which can be separated in signal and noise subspaces at the cut-off index which can be found e.g. by noise reduction. The cut-off index $L_{eff}$ is dependent on the SNR. From the last component of vector P, which contains noise only under typical points of operation, the noise power $P_N$ can be estimated. From the total power in vector $P_{tot} = H^H H$, the SNR can be estimated as $SNR = P_{tot}/P_N - 1$. Depending on the SNR, the cut-off index $L_{eff}$ can be chosen. Only the components of vector P with smaller indices are actually needed to reconstruct the channel within the chunk. This can be used for feedback compression, provided that the projection (A.8) is already done at the terminal. Then, only the first components in vector P must be retransmitted to the base station, where the second step of the interpolation is finally performed.

3. Feed-Back of Downlink Channel State Information

With the chunk-wise interpolation, we are in a position where it is sufficient to

- either perform projection (A.8) at the terminal and feed back the principal components in the delay domain
- or to directly feed-back the estimated channel coefficients at the subcarriers with pilot signals to the base station Since the second approach is simpler, faster and independent of the processing power available at the terminal, it may be preferable. On the other hand, the first approach costs less signalling overhead.

Generally the feedback could be organized as

- analog transmission of the estimated channels at pilot positions
- digital transmission of quantized estimates at pilot positions
- analog or digital retransmission after feedback compression (A.8) as described in section 2.2.2.

While the analogue transmission is simpler it has the disadvantages that it is usually less reliable than digital transmission and that the estimation error is further enhanced due to (and limited by) the additional noise and interference in the uplink channel.

Digital transmission of channel state information is hence preferred. It is interesting to investigate the impact of quantization. Typically, it should cause a MSE of less than −30 dB, for which 6 bit resolution of the real and imaginary part of the channel amplitude may be sufficient (5 bits plus sign). If we assume a chunk width of 16 subcarriers, for which we have seen in FIG. 10 that 3 pilots are sufficient, altogether 3·2·6=32 bits are needed for feed back in the uplink to reconstruct the entire channel frequency response inside the downlink chunk. Using QPSK modulation, this just fills up a complete chunk in a single long OFDM data symbol in the uplink, where we can transmit up to 16·2 bits. Of course, a slowly varying scaling factor must be agreed between terminal and base station in addition which could be determined already in the chunk assignment phase.

4. Reconstruction of Downlink Channel State Information from Quantized Feed-Back After the base station has received the estimates of the downlink channel state information for each terminal, it performs or finalizes the chunk-wise interpolation individually for each terminal and uses this information for instance for downlink pre-processing.

It is certainly possible to apply the described transmission of channel state information and interpolation at the terminal side using feedback information relating to uplink channels fed back by the base station to the terminal.

5. Summary

The method provides a new scheme for chunk allocation and efficient feed-back of channel state information to the transmitter (e.g. a base station) is proposed for an OFDMA radio communication system. Significant saving in feed-back overhead is achieved in a well-organized scheme of four steps

- Use an efficient scheme for chunk assignment once per MAC frame as described above. The feed-back of channel state information is generally most efficient in chunks assigned since communications is reliable there and minimum redundancy is required.
- Use sparse pilot grids for channel estimation within sub-frames to reduce the information about the channel to the minimum required for proper reconstruction at the transmitter.
- Use a sufficient quantization of the channel estimates (or analogue transmission) and feed-back the down-link channel state information to the base station via the uplink chunks assigned.
- Use a new method called chunk-wise interpolation to reconstruct the channel frequency response in chunks assigned for transmission. The method has a significantly reduced computational complexity but it can still realize noise-limited interpolation results when the pilot grid is properly designed.

As a result, just a single long OFDM symbol in each frame may be sufficient to reliably feed back the complete downlink channel state information of all terminals to a base station having a single antenna in frequency-division duplex system. Of course, this overhead rises linearly with the product of the numbers of base station and terminal antennas in FDD mode.

REFERENCES

Appendix A

Full-Spectrum Interpolation

The interpolation is based on the elementary relation $$H_n = \sum_{l=0}^{L-1} h_l \exp\left(-j2\pi \frac{nl}{N_c}\right) \quad (A.1)$$

between frequency- and time-domain channel coefficients ($H_n$ and $h_l$, respectively) in OFDM systems. (A.1) is a set of $N_c$ equations with L variables where L is the number of taps (i.e. resolved multi-paths). To solve for $h_l$, the values $H_n$ are stacked in a ($1 \times N_c$) vector H where $N_c$ is the total number of subcarriers. Similar to the discrete Fourier transform, (A.1) is rewritten as a multiplication of a ($N_c \times L$) matrix W with a vector containing the time-domain channel coefficients stacked in the ($1 \times L$) vector h $$H = W \cdot h \quad (A.2)$$

where the elements of matrix W are given as $$W_{nl} = \exp\left(-j2\pi \frac{nl}{N_c}\right). \quad (A.3)$$

In practice, some values in H are not available, due to the spectrum mask or the presence of additional pilot signals used for synchronisation. The available estimates are hence described by a reduced form of (A.1) as $$H_{red} = W_{red} \cdot h + N_{red} \qquad (A.4)$$

where the index red means that the rows corresponding to the missing estimates in H and W are filled with zeros. Also there is a vector $N_{red}$ in (A.4) describing the estimation error. First, the time-domain estimates are obtained by using the pseudo-inverse $W^+_{red}$ as $$\hat{h} = W^+_{red} \cdot H_{red} \qquad (A.5)$$

when $W_{red}$ is well conditioned. This is true only for $N \geq L$ (interpolation rule). In a second operation (A.1) is used to interpolate the channel coefficients.

This way we get useful results also for channel coefficients on those subcarriers where estimates are not available! Note that the product $W \cdot W^+_{red}$ has dimension $(N_c \times N_c)$ but rank L, which explains the filtering effect observed in FIG. 7. In the implementation, it may be more efficient to use an FFT instead of (A.1) for the second operation.

Appendix B

Chunk-Wise Interpolation

Note that with chunk-wise transmission, the duration of the guard interval remains the same. But due to the limited bandwidth of the chunk, the temporal resolution of the impulse response is somehow reduced. Intuitively we would expect that the channel impulse response within a chunk contains less information than the full-spectrum impulse response, i.e. less taps are actually resolved. Hence, the number of independent degrees of freedom (DOF) in the channel is reduced with a smaller chunk bandwidth. Consequently, it should be possible to reconstruct the channel frequency response also within a chunk using a sparse pilot grid having at least as many pilot signals as the channel has DOFs. The number of pilot signals required in the grid must be equal at least to the number of DOF.

Experience shows that this intuitive approach cannot be directly realized. The bandwidth reduction causes the matrix $W_{red}$ to become singular and this hampers calculation of the channel impulse response. Reducing L (as intuitively expected) works well only for very short channel impulse responses.

Figure 11:
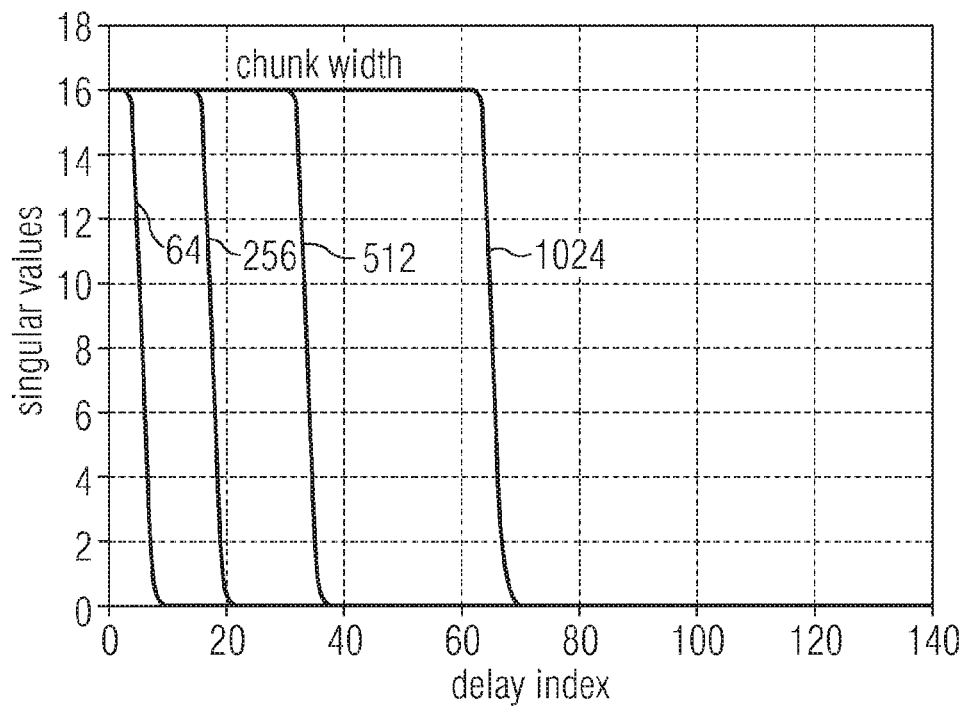
FIG. 11 is a graph of singular values of $W_{red}$ versus delay index for 2048 subcarriers and various chunk widths.

Here we describe a more abstract but systematic approach which essentially has the same features as one expects intuitively. At first we perform the singular value decomposition $$W_{red} = U_{red} \cdot D_{red} V_{red}^H \qquad (A.6)$$

and plot the singular values on the main diagonal of $D_{red}$ versus the delay index for various chunk sizes in FIG. 11.

Obviously, if we reduce the chunk bandwidth, we get fewer relevant singular values. This coincides with the intuitive expectation that the time resolution is reduced. There is some cut-off index $L_{eff}$ where singular values get very small depending essentially on the chunk bandwidth and slightly also on the pilot grid in the chunk. The increasing number of zero singular values indicates that $W_{red}$ becomes the more singular the smaller the bandwidth is. Since the matrix is singular, the reconstruction of taps in time domain using (A.5) is corrupted by noise amplification, as mentioned above.

From adaptive MIMO communication systems it is known how to regularize such cases. Here it is proposed to perform the multiplication with $W^+_{red}$ in (A.5) several steps. Equation (A.5) can be written as $$\hat{h} = V_{red} \cdot D_{red}^+ \cdot |U_{red}^H H_{red} \qquad (A.7)$$

We split this operation at the vertical bar indicated in (A.7). The cut-off index $L_{eff}$ separates the delay space into signal and null sub-spaces. Only where singular values are strong enough, one can find relevant information about the channel. Since $W_{red}$ is known to the receiver, the singular value decomposition can be performed and, first, the pilots in the grid are projected onto the delay space as $$P = U_{red}^H \cdot H \qquad (A.8)$$

Figure 12:
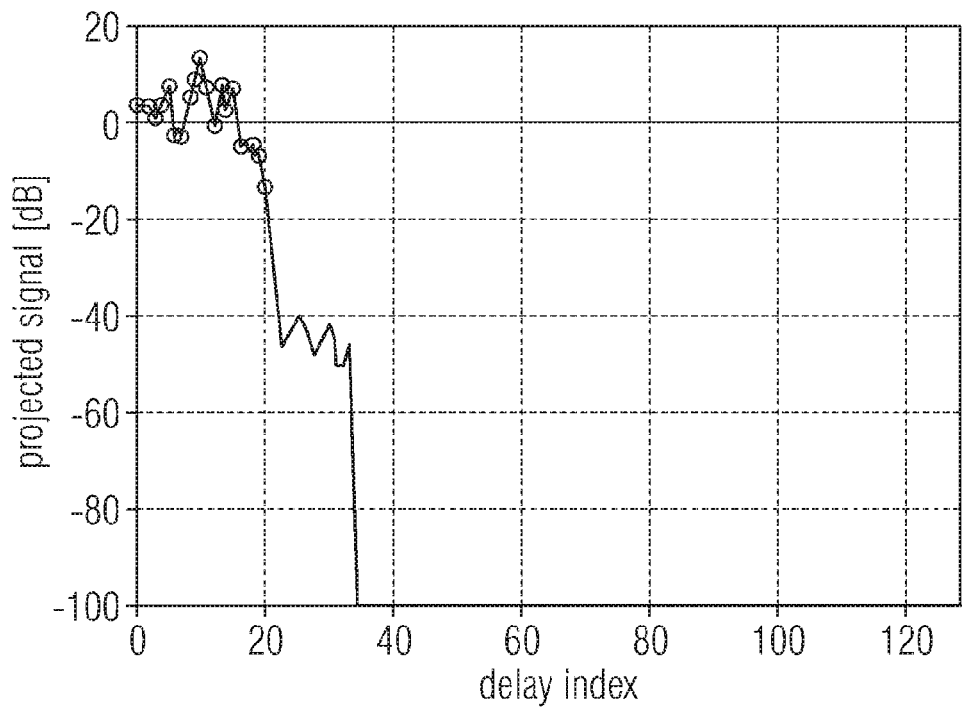
FIG. 12 is a graph of projection from a sparse pilot grid onto the delay space.

A typical result of this projection is shown in FIG. 12 at an SNR of 40 dB. There are a number of significant components at lower delay indices, a noise floor at somewhat higher indices as well as zero signals above a certain threshold.

While the first edge in FIG. 12 comes from the cut-off index described above, and separates in principle relevant information from noise, the second edge at a delay index of about 33 in FIG. 12 is due to the fact that within a chunk there are limited numbers of pilots in the grid. Of course, the total number of non-zero components in the delay space cannot exceed the total number of pilots in a chunk.

Next, we need to separate the useful information from noise. This can be realized as follows: Assume that the signal-to-noise ratio (SNR) is known to the receiver. The sum of signal and noise is equal to the total power received $$P_{tot} = P_{sig} + P_{noise} \qquad (A.9)$$
$$SNR = P_{sig} / P_{noise} \rightarrow P_{sig} = \frac{P_{total}}{1 + SNR}.$$

Hence, if the strongest paths in the delay domain are accumulated until a fraction $1/(1+SNR)$ of the total power is reached, it is reasonable to declare these strong paths to signal and others as noise. Now the noise components are forced to zero which has a similar effect as the noise reduction used in the original full-spectrum algorithm. The result is a de-noised vector $P_{denoise}$ to be processed further. Notice that due to the fading in the channel some components in the vector $P_{denoise}$ may be forced to zero by the de-noising algorithm while having an index well below the cut-off. Vice versa, some other components above the threshold may be identified as signal but actually contain noise. In such cases, one often observes over-shootings in the interpolated frequency response which can be avoided by forcing the components beyond the cut-off to zero in addition. It is difficult to predict the actual position of the cut-off index accurately. It can however be found empirically by computer experiments (for a given OFDM parameter set, pilot grid and chunk width) by minimizing the mean square error (MSE) between the perfectly known channel and the interpolation. The MSE may show an error floor at high SNR when this empirical threshold is not properly optimized. $P_{denoise}$ may have zero components also beyond the cut-off index which are regarded as signal but actually contain noise. These components should be forced to zero in addition to reduce overshooting.

Now we can conclude the interpolation, i.e. perform the residual multiplications after the horizontal bar in (A.7) and the multiplication with the matrix W similar to (A.2) but of course taken only inside the chunk $$\hat{H} = W \cdot V_{red} \cdot D_{red}^+ \cdot P_{denoise} \qquad (A.10)$$

which reconstructs the frequency response in the chunk. An exemplary result is shown in FIG. 13 for an OFDM system with parameters close to the 3GPP LTE study item (2048 sub-carriers at 30 MHz sampling rate, 128 samples CP) and a chunk width of 256 carriers. The exemplary channel is heavily frequency-selective based on an exponential power-delay profile with 3 µs delay spread. The SNR is 30 dB. Obviously, a precise chunk-wise interpolation becomes possible using the new method described above.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to exemplary embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating a radio communication system which uses at least a first frequency band, having a first bandwidth, subdivided into C radio resource units which are allocable for radio transmissions between radio stations and terminals, where each radio resource unit has at least two adjacent subcarriers, for allocation of at least a first radio resource unit for a data transmission between a terminal and a radio station, comprising:
   receiving at the radio station from the terminal a first short training symbol simultaneously from N terminals as N first short training symbols, the first short training symbol having spectrally the first bandwidth and at least Q frequency carriers, where Q is at least as large as C but smaller than a total number of the subcarriers;
   estimating at the radio station a radio channel for at least the first radio resource unit using the first short training symbol received at the radio station;
   broadcasting an allocation of the first radio resource unit to the terminal by the radio station;
   transmitting the N first short training symbols by the N terminals in an orthogonal way by focussing the respective transmission energy in different frequency carriers; and
   repeating said transmitting of the N first short training symbol J times, where J is not larger than N, while cyclically changing for each terminal the frequency carriers into which the energy is focussed.

2. The method according to claim 1, wherein time division duplex is used to separate transmissions to and from terminals and the first radio resource unit is allocated for transmissions to and from the terminal.

3. The method according to claim 2, wherein said broadcasting uses at least two short signalling symbols for the allocation of the first radio resource unit, with each short signalling symbol transmitted using at least one subcarrier of the first radio resource unit, and bits received on the at least one subcarrier over the at least two short signalling symbols build a binary word identifying the terminal.

4. The method according to claim 2, further comprising broadcasting the first short training symbol by the radio station.

5. The method according to claim 1,
   wherein frequency division duplex is used to separate the radio transmissions to and from the terminals, and
   wherein at least a second frequency band, used for the radio transmissions from the radio stations to the terminals, is subdivided into K radio resource units which are allocable for the radio transmissions.

6. The method according to claim 5,
   wherein said broadcasting uses at least two short signalling symbols for the allocation of the first radio resource unit, with each short signalling symbol transmitted using at least one subcarrier, of at least one radio resource unit of the second frequency band, associated with the first radio resource unit at the terminals, and
   wherein bits received on the at least one subcarrier of a single radio resource unit over the at least two short signalling symbols build a binary word identifying the terminal.

7. The method according to claim 5,
   further comprising broadcasting by the radio station a second short training symbol for estimation of radio channels of the K radio resource units of the second frequency band, and
   wherein the second frequency band has a second bandwidth and the second short training symbol has spectrally the second bandwidth and has at least Q' frequency carriers where Q' is at least as large as K but smaller than the total number of the subcarriers.

8. The method according to claim 7, wherein said receiving includes the radio station receiving resource information from the terminal on the first radio resource unit, the resource information identifying at least a second radio resource unit of the second frequency band to be allocated by the radio station.

9. The method according to claim 8, wherein the resource information includes at least two transmission symbols received by the radio station on the first radio resource unit and bits of the at least two transmission symbols build a binary word identifying the second radio resource unit.

10. The method according to claim 9, wherein said broadcasting uses at least two short signalling symbols for allocation of the second radio resource unit, each short signalling symbol being broadcasted using the second radio resource unit and bits of the at least two short signalling symbols build a binary word identifying the terminal.

11. The method according to claim 10, wherein Orthogonal Frequency Division Multiplex is used for the radio transmissions.

12. The method according to claim 11, wherein Orthogonal Frequency Division Multiple Access is used for separation of different terminals.

13. A method for operating a radio communication system which uses at least first and second frequency bands having first and second bandwidths, respectively, the first frequency band being subdivided into C radio resource units which are allocable for radio transmissions between radio stations and terminals and the second frequency band being subdivided into K radio resource units which are allocable for the radio transmissions, each radio resource unit having at least two adjacent subcarriers, said method allocating at least a first radio resource unit for a data transmission between a terminal and a radio station, comprising:
   receiving at the radio station from the terminal a first short training symbol which has spectrally the first bandwidth and has at least Q frequency carriers, where Q is at least as large as C but smaller than a total number of the subcarriers;
   estimating at the radio station a radio channel for at least the first radio resource unit using the first short training symbol received at the radio station;
   broadcasting an allocation of the first radio resource unit to the terminal by the radio station;

transmitting long training symbols by the radio station and/or the terminal for estimation of allocated radio channels of allocated radio resource units, each long training symbol having spectrally one of the first and second bandwidths and a structure like one of the first and second frequency bands;

transmitting pilot signals on at least two subcarriers in each allocated radio resource unit of a respective frequency band; and calculating alternate radio channels, relating to subcarriers on which no pilot signals are transmitted, by interpolation between received pilot signals in each case within one of the allocated radio resource units.

14. The method according to claim 13, further comprising transmitting feedback information relating to the received pilot signals from the terminal to the radio station and/or from the radio station to the terminal.

15. The method according to claim 13,
further comprising projecting the received pilot signals onto a delay space, and
wherein the feedback information contains only information relating to high-power pilot signals which have a power value greater than a threshold.

16. The method according to claim 15, wherein the threshold is dependent on a signal-to-noise ratio of the received pilot signals.

17. A method for operating a radio communication system which uses at least a first frequency band having a bandwidth and subdivided into C radio resource units which are allocable for radio transmissions between radio stations and terminals and each radio resource unit has at least two adjacent subcarriers, the method comprising allocating at least a first radio resource unit for transmissions from a radio station to a terminal and/or from the terminal to the radio station, transmitting by the radio station and/or the terminal a long training symbol for estimation of radio channels of the first radio resource unit, the long training symbol having spectrally the bandwidth and structure of the first frequency band;

transmitting pilot signals on at least two subcarriers of the first radio resource unit, calculating radio channels relating to subcarriers of the first radio resource unit on which no pilot signals are transmitted by interpolating between the at least two subcarriers, transmitting feedback information relating to received pilot signals from the terminal to the radio station and/or from the radio station to the terminal, and projecting the received pilot signals onto a delay space, the feedback information containing only information relating to high-power pilot signals which have a power value greater than a threshold.

18. The method according to claim 17, wherein the threshold is dependent on a signal-to-noise ratio of the received pilot signals.

19. A radio station for a radio communication system which uses at least first and second frequency bands having first and second bandwidths, respectively, the first frequency band being subdivided into C radio resource units which are allocable for radio transmissions between radio stations and terminals, and the second frequency band being subdivided into K radio resource units which are allocable for the radio transmissions, each radio resource unit having at least two adjacent subcarriers, the radio station allocating at least a first radio resource unit for a data transmission between a terminal and the radio station, the radio station comprising:

means for receiving from the terminal a first short training symbol which has spectrally the bandwidth of the first frequency band and has at least Q frequency carriers, where Q is at least as large as C but smaller than a total number of subcarriers;

means for estimating a radio channel for at least the first radio resource unit using the first short training symbol received by said radio station and long training symbols, each having spectrally one of the first and second bandwidths and a structure like one of the first and second frequency bands;

means for broadcasting an allocation of the first radio resource unit to the terminal; and means for transmitting pilot signals on at least two subcarriers in each allocated radio resource unit of a respective frequency band, enabling calculation of alternate radio channels, relating to subcarriers on which no pilot signals are transmitted, by the terminal interpolating between received pilot signals in each case within one of the allocated radio resource units.

20. A terminal for a radio communication system which uses at least first and second frequency bands having first and second bandwidths, respectively, the first frequency band being subdivided into C radio resource units which are allocable for radio transmissions between radio stations and terminals, and the second frequency band being subdivided into K radio resource units which are allocable for the radio transmissions, each radio resource unit having at least two adjacent subcarriers, for allocation of at least a first radio resource unit for a data transmission between the terminal and a radio station, the terminal comprising:

means for transmitting to the radio station a first short training symbol which has spectrally the bandwidth of the first frequency band and has at least Q frequency carriers, where Q is at least as large as C but smaller than a total number of subcarriers, the radio station estimating the radio channel for at least the first radio resource unit using the first short training symbol;

means for receiving a broadcasted allocation of the first radio resource unit from the radio station and pilot signals on at least two subcarriers in each allocated radio resource unit of a respective frequency band; and means for calculating alternate radio channels, relating to subcarriers on which no pilot signals are transmitted, by interpolation between received pilot signals in each case within one of the allocated radio resource units.

* * * * *